P. L. FRAZIER.
MILK CAN HANDLE.
APPLICATION FILED MAR. 12, 1917.

1,243,278.

Patented Oct. 16, 1917.

WITNESSES
W. C. Fielding
Wm H Mulligan

INVENTOR
Philip L. Frazier

BY Richard B Owen

ATTORNEY

UNITED STATES PATENT OFFICE.

PHILIP L. FRAZIER, OF ROCKBURY, CONNECTICUT.

MILK-CAN HANDLE.

1,243,278.  Specification of Letters Patent.  Patented Oct. 16, 1917.

Application filed March 12, 1917. Serial No. 154,266.

*To all whom it may concern:*

Be it known that I, PHILIP L. FRAZIER, a subject of the King of Great Britain, residing at Rockbury, in the county of Litchfield and State of Connecticut, have invented certain new and useful Improvements in Milk-Can Handles, of which the following is a specification.

This invention relates to improved construction for container handles and more particularly to a device for facilitating the quick and expeditious repairing of handles for milk cans.

The primary object of the invention is to provide an improved handle construction whereby the part thereof that is generally and most likely to become defective may be easily repaired at a minimum expense.

A further object of this invention is the provision of a container handle which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
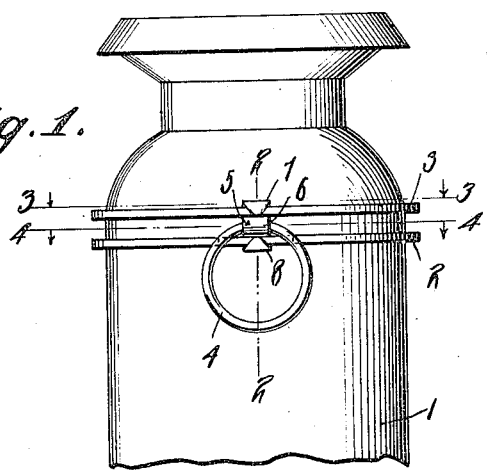
Figure 1 is a fragmentary side elevation of a milk can showing my invention applied.

Referring to the drawing, wherein is illustrated the preferred form of my invention, and in which like numerals of reference indicate corresponding parts throughout the several views, the body 1 of the milk can is provided adjacent its upper end with a pair of annular rings 2 and 3, slightly spaced apart and arranged in superposed relation.

The handles for the milk can are disposed at diametrically opposite sides in the usual manner and, since both of the handles are mounted alike, only one will be hereinafter described to set forth the construction of this invention. The handle is in the form of a ring 4 and is attached to the superposed flanges 2 and 3 by a fastening clip 5 which consists of a metal band bent intermediate its ends to provide the yoke 6 for embracing a portion of the ring 4. Each end of the clip is bent upon itself to form the loops 7 and 8 which are formed after extending the ends of the clip through suitable openings provided for their reception in the flanges 2 and 3.

Figure 2:
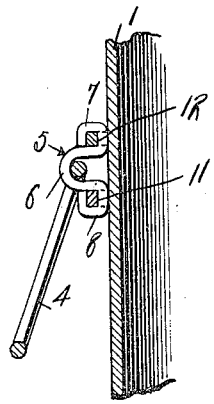
Fig. 2 is an enlarged section on the line 2—2 of Fig. 1.
Figure 3:
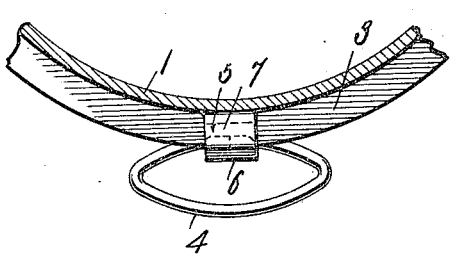
Fig. 3 is a fragmentary section on the line 3—3 of Fig. 1.
Figure 4:
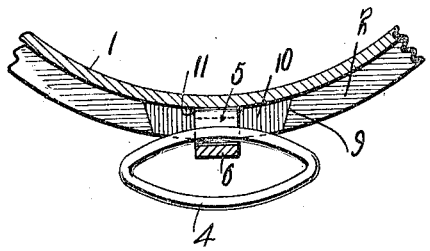
Fig. 4 is a similar section taken on the line 4—4 of Fig. 1.

The lowermost flange 2, as clearly shown by Fig. 4 of the drawing, has a portion removed to provide the space 9, while the edges of the flange which form the ends of the space are beveled whereby the space assumes a wedge shape. A removably mounted wedge 10 is constructed to fit tightly in the wedged shape space 9, and the wedge 10 has its ends beveled to snugly contact with the ends of the flange formed by the space so that when the wedge is tightly driven into place, it will be prevented from being displaced except by driving the same downwardly. The wedge member 10 is provided on its inner edge with a recess 11, while directly above the wedge, the flange 3 is provided with a similar recess 12. These recesses 11 and 12 receive the ends 7 and 8 of the yoke 5, and after the ends have been inserted they may be bent over and around the outer marginal edges of the flanges as clearly shown by Figs. 1 and 2 of the drawing, to securely fasten the yoke in place thus retaining the handle 4 in position. It is to be observed that the side portions of the yoke 6 are spaced apart sufficiently to snugly engage the proximate surfaces of the flange 2, and the wedge 10. This construction prevents the displacement of the wedge in any other manner except by removing the loop or end 8 of the yoke. The wedge formation prevents the wedge 10 from being laterally displaced, while the connection of the yoke with the ridge ring or flange 3 prevents the wedge from being vertically displaced. It is obvious, therefore, that the handles 4 may be used to lift and carry the can. The portion of the ring 2 which is provided with the wedge 10 is, however, the part that is generally the quickest to become defective and in need of repairing. Under the old construction it was necessary to resort to solder or the like to make any necessary repairs. In the present device it is merely necessary to remove the end 8 of the yoke and extract the wedge 10 whereupon a new wedge may be mounted in place to which the yoke may be fixed and the construction will be as strong and durable as in its original state.

From the foregoing it will be observed that a very simple and durable container handle has been provided, the details of which embody the preferred form. I desire it to be understood however, that slight changes in the minor details of construction may be made without departing from the spirit of the invention or the scope of the claims hereunto appended.

I claim:

1. A container handle fastening device comprising a pair of annular flanges, one of the flanges having a wedge shaped space, a handle, a wedge member arranged in the said wedge shaped space, and a fastening element embracing the said handle and connected to the said wedge member and the other of said flanges.

2. A container handle fastening device comprising a pair of annular spaced apart flanges, the uppermost flange having a recess and the lowermost flange provided with a wedge shaped space, a wedge removably mounted in the space, and means for supporting the handle and engaged with the said wedge for preventing displacement thereof, the said means being rigidly secured in the said recess.

3. A container handle fastening device comprising a pair of spaced apart annular flanges, the uppermost flange having a recess formed therein, the lowermost flange provided with a wedge shaped space directly below the said recess, a handle, a yoke embracing the handle and disposed in the space between the said flanges and having one end fixed in the recess, and means mounted in the wedge shaped space and engageable with the opposite end of the said yoke whereby the said means will be prevented from accidental displacement from the wedge shaped space.

4. A container handle fastening device comprising a pair of spaced apart annular flanges, the uppermost flange having a recess formed therein, the lowermost flange provided with a wedge shaped space directly below the said recess, a handle, a yoke embracing the handle and disposed in the space between the said flanges and having one end fixed in the recess, means mounted in the wedge shaped space and engageable with the opposite end of the said yoke whereby the said means will be prevented from accidental displacement from the wedge shaped space, the said yoke including loops embracing the uppermost flange and the said means.

In testimony whereof I affix my signature in presence of two witnesses.

PHILIP L. FRAZIER.

Witnesses:
JOSEPHINE MITCHELL,
ANTOINETTE H. SMITH.

Copies of this patent may be obtained for five cents each, by addressing the "Commissioner of Patents, Washington, D. C."